US012561704B2

(12) United States Patent
Disher

(10) Patent No.:    US 12,561,704 B2
(45) Date of Patent:        Feb. 24, 2026

(54) SYSTEM FOR MANAGING REMOTE PRESENTATIONS

(71) Applicant: Webinarin, LLC, Boca Raton, FL (US)

(72) Inventor: Kyle Disher, Boca Raton, FL (US)

( * ) Notice: Subject to any disclaimer, the term of this patent is extended or adjusted under 35 U.S.C. 154(b) by 363 days.

(21) Appl. No.: 17/899,601

(22) Filed: Aug. 30, 2022

(65) Prior Publication Data

US 2023/0091856 A1     Mar. 23, 2023

Related U.S. Application Data

(60) Provisional application No. 63/260,694, filed on Aug. 30, 2021.

(51) Int. Cl.
*G06Q 30/0201*        (2023.01)
*G06F 16/3332*        (2025.01)
*G06Q 10/0639*       (2023.01)

(52) U.S. Cl.
CPC ..... *G06Q 30/0201* (2013.01); *G06F 16/3334* (2019.01); *G06Q 10/06398* (2013.01)

(58) Field of Classification Search
CPC ......... G06Q 10/06398; G06Q 30/0201; G06F 16/3334
See application file for complete search history.

(56) References Cited

U.S. PATENT DOCUMENTS

2002/0120461 A1 *   8/2002   Kirkconnell-Ewing ....................
                                                    G06Q 30/02
                                                    705/346
2012/0059662 A1 *   3/2012   Huisman, Jr. ......... G06Q 10/10
                                                    705/1.1

2015/0254681 A1 *   9/2015   Mahnken ........... G06Q 30/0201
                                                    705/7.29
2021/0150548 A1 *   5/2021   Dua .................... G06F 18/2113
2021/0258424 A1 *   8/2021   Brown .................. G06Q 30/01

OTHER PUBLICATIONS

Ali, et al., CRM Sales Prediction Using Continuous Time-Evolving Classification, 32 Proceedings of the AAAI Conference on Artificial Intelligence 7727 (2018) (Year: 2018).*

* cited by examiner

*Primary Examiner* — Charles Guiliano

(74) *Attorney, Agent, or Firm* — Christopher Beckman; Beckman Law P.C.

(57)                ABSTRACT

New systems, devices and methods for managing remote presentations and other human capital intensive projects are provided. New teleconferencing and relationship management systems are provided that manage a wide variety of project management aspects relevant to such presentations. In some embodiments, new forms of graphical user interface are provided, enabling a user to engage a wide variety of potential business partners (e.g., sales leads) with similar presentations, while managing a common project and facilitating the introduction of many, disparate forms of media, and interfacing with auxiliary media systems. In some embodiments, inbound and outbound business prospects are generated and engaged with the aid of GUI sub-tools specialized for closing leads. In some such embodiments sales, marketing and education initiatives are created and managed by the teleconferencing and relationship management system.

20 Claims, 6 Drawing Sheets

SYSTEM FOR MANAGING REMOTE PRESENTATIONS

CROSS-REFERENCE TO RELATED APPLICATIONS

This application claims the benefit of priority to U.S. Provisional Application No. 63/260,694, filed Aug. 30, 2021, titled "Methods for Lead Management over a Computer Network," the entire contents of which is herein incorporated by reference in its entirety.

FIELD OF THE INVENTION

The present invention relates to the field of managing remote presentations via specialized hardware. The present invention also relates to systems, devices and methods for project management.

BACKGROUND

Teleconferencing began with the inception of telephony in the late 19th century, when Alexander Graham Bell commercialized his patent on the telephone. After transcontinental phone infrastructure was laid, including multiplex switchboards, it became possible to connect more than two participants in an audio teleconference. In an early notable teleconference, Bell himself was connected with the mayors of San Francisco and New York and President Wilson, to commemorate the Panama-Pacific International Exposition of 1915. The call was extremely difficult and expensive to connect, and audio teleconferencing would not become accessible to the public for many years to come.

In the 1950's, Bell Labs and AT&T began creating teleconferencing systems for commercial use in earnest, including early video conferencing technologies. AT&T's PICTUREPHONE was displayed at the World's Fair in New York, in 1956. The PICTUREPHONE met with a lukewarm reception. The PICTUREPHONE system was extremely expensive and complicated to operate, and the video image quality was poor. AT&T eventually launched general commercial service for the PICTUREPHONE in 1970, but it was rarely used. Teleconferencing, and video teleconferencing in particular, remained expensive and unpopular for decades. But major electronics companies continued to develop new systems for decades. For example, AT&T launched the VIDEOPHONE in 1992, but this teleconferencing system again had a high price tag, and still met with a tepid reception, forcing AT&T to offer large discounts.

In 1999, KYOCERA introduced what might have been the first general commercial offering of a camera-enabled wireless telephone—the VISUALPHONE VP-210. Operating at a rate of 2 frames per second ("FPS"), its front-facing camera allowed users to hold video teleconference calls from remote locations.

In modern times, teleconferencing may be carried out over several possible forms of communications networks, including wireless networks and/or the Internet. Teleconferencing systems by ZOOM and WEBEX are among the most popular software-based options available over the Internet, and run at about 30 FPS. This frame rate is some 15× the output of VISUALPHONE in 1999, and around the rate of modern cinematic frame rates. But lag has remained a persistent problem raised frequently by users. Some teleconferencing software applications include texting (a.k.a. "chat") features, and virtual whiteboards, allowing multiple team members on a project to collaborate on written work in real time, as well as oral conversations. Recently, the popularity of these modern platforms has increased, albeit, perhaps, temporarily, with the onset of the Covid-19 global pandemic beginning in 2019, which has placed a premium on collaboration between people at a safe distance.

Despite increasing, long-felt needs for better teleconferencing systems, all modern offerings remain widely criticized in comparison to in-person conferencing, for several of reasons. For example, "telepresence" through such systems may feel less genuine and familiar than actual, in-person meetings, and there are frequent technical issues inherent in teleconferencing technologies. Some new teleconferencing systems include robot-mounted cameras and video projection displays in place of a "head" of the robot), and allow the robot to serve as a telepresence avatar of a remote conference participant—moving like a person through another participant's physical environment. However, these systems remain a long way from bridging an uncanny valley of teleconferencing—users remain uncomfortable with teleconferencing systems, and there remains a strong, long-felt need for better teleconferencing systems, devices and methods.

It should be noted that some of the disclosures set forth as background, such as, but not limited to, the above language under the heading "Background," do not relate exclusively to prior art and the state of the art in the field(s) of the invention, and should not be construed as an admission with respect thereto.

SUMMARY OF THE INVENTION

New systems, devices and methods for managing remote presentations and managing projects are provided. In some embodiments, new kinds of teleconferencing and relationship management systems for managing such remote presentations are provided, that manage a wide variety of project management aspects relevant to such presentations. For example, in some embodiments, specialized computer hardware and software of such a teleconferencing and relationship management system include a new form of graphical user interface ("G.U.I.") enabling a user to engage a wide variety of business partners and prospects ("business prospects"), such as sales leads, with similar presentations, while managing a common project and facilitating the creation or other introduction of many disparate forms of media, interfacing with numerous auxiliary media systems. In some embodiments, inbound and outbound business prospects (e.g., inbound and outbound sales leads) are generated and managed by such a teleconferencing and relationship management system. For example, in some such embodiments sales, marketing and education initiatives are created and managed by the teleconferencing and relationship management system.

In some embodiments, such a teleconferencing and relationship management system includes a sales lead management module. In some such embodiments, the sales lead management module (a.k.a., a "BLITZDIAL subsystem" or "BLITZDIAL component") is configured to create one or more sales lead sub-modules, each being dedicated to a particular sales lead, and each including contact information, identifying information, and additional tools and relevant data to be used in attempting to close that sales lead. In some embodiments, the sales lead management module selects certain sales leads as more urgent and/or time-sensitive to engage (a.k.a. "hot sales leads") than other sales leads managed by the teleconferencing and relationship management system. Hot sales leads, and sales lead sub-modules, may be created, and engaged (e.g., via telephone call) within an extremely fast time window in some embodiments (e.g., within 2 seconds, 5 seconds, 10 seconds, or 30 seconds), which may be determined in advance by a user and/or the teleconferencing and relationship management system. In some embodiments, such an additional tool of such a sales lead sub-module includes a G.U.I. presenting one or more sub-tools (e.g., a G.U.I. button or slider) for immediately taking a plurality of actions to pitch such a hot sales lead (a "consolidated action" sub-tool). In some such embodiments, such a sub-tool includes a telephone calling tool, configured to immediately place a telephone call to the hot lead, with a single gesture by a user. In some such embodiments, such telephone calls may be placed with the aid of a script, which may be generated and spoken to a call recipient (e.g., a person or entity subject to the sales lead sub-module), at least in part, by an artificial intelligence module of the system. In some embodiments, such a script is generated according to an algorithm based on information relevant to the type of sales lead or other business prospect, and other characteristics of that prospect, in some embodiments. In some embodiments, any of a: recency of contact, credit score, soft credit score, informal credit score, externally mined employment data (e.g., employment status, employment title, employer type, salary information, etc.), type of business experience or interest, and/or demographic information of the person or entity, the sales lead and/or business prospect, may positively or otherwise impact a higher urgency rating and/or generated script elements by the artificial intelligence module. In some embodiments, such a sub-tool includes a text messaging tool, configured to immediately send a specialized text message to the hot lead, with a single gesture by a user. In some embodiments, such a sub-tool includes a tool with specialized "next call" functionality, again, configured to be activated with a single gesture by a user, which is configured place a telephone call to the hot lead immediately after previously scheduled call has ended. In some embodiments, any of the above such sub-tool(s) is/are also impacted by the artificial intelligence module, and may include a specialized sub-tool of the sub-tool(s), configured to immediately send an e-mail, text message, or other type of contact to the hot lead, with a single gesture by a user, according to such a script. In some embodiments, such a sub-tool includes an interface with an AI module of the teleconferencing and relationship management system (such as any of the AI modules set forth in this application) which pre-generates a part of such an e-mail, text message or other communication (by part of any of the scripts that may be generated, as set forth in this application) to be so sent upon receiving input from such a sub-tool and single gesture.

In some embodiments, another new form of GUI of the teleconferencing and relationship management system enables a third-party facilitator to aid such a user in such project management aspects.

In some embodiments, such auxiliary media systems of a teleconferencing and relationship management system include new forms of learning management systems ("LMS"). In some embodiments, such an LMS includes a specialized control system, which may include such specialized computer hardware and software, which ranks and assigns media content to be consumed and tests to be passed by a user of the teleconferencing and relationship management system. In some embodiments, such media content to be consumed and tests to be passed are selected by the control system, based on particular new types of interactions with the teleconferencing and relationship management system, as determined by an A.I. sub-module of the teleconferencing and relationship management system, which will be set forth in greater detail below.

In some embodiments, the teleconferencing and relationship management system, or any of the subsystems or modules thereof, may be configured for white labeling. For example, in some embodiments, the teleconferencing and relationship management system is configured to facilitate a super-administrative user providing an administrative account to an administrative user of the teleconferencing and relationship management system. In some such embodiments, such an administrative account includes custom branding tools, allowing the administrative user to upload graphics and other content matching business branding of the administrative user, and removing business branding of the super-administrative user.

In some embodiments, a module of the teleconferencing and relationship management system facilitates an administrative user engaging with the system as a business prospect (e.g., a sales lead or hot sales lead), to evaluate the user's performance in servicing such a business prospect (a.k.a. a "mystery shop" module). In some such embodiments, such a mystery shop module includes an artificial intelligence ("AI") based sub-module that develops unique data and transcribes language used in engaging a business prospect, rating that language based on the presence or absence of key words, and selects media content and tests to be passed by the user based on such a rating. In other, related aspects, such an AI submodule develops a performance rating for a user performing business development activities using the teleconferencing and relationship management system, based on length of time, quality of engagement, speed of response after receiving a lead, and other performance indicating data. In other, related aspects, such an AI submodule develops benchmark data ranges and thresholds based on similarly applying the mystery shop module to a competitor's business development staff and resources (e.g., sales representatives) to generate a peer performance rating. In some such embodiments, if such a performance rating for a user does not meet or exceed such a peer performance rating, the A.I. sub-module of the teleconferencing and relationship management system selects particular LMS resources to assist the user in improving her or his performance.

Canons of Construction

Where any term is set forth in a sentence, clause or statement ("statement") in this application, each possible meaning, significance and/or sense of any term used in this application should be read as if separately, conjunctively and/or alternatively set forth in additional statement(s), after the sentence, clause or statement, as necessary to exhaust the possible meanings of each such term and each such statement.

It should also be understood that, for convenience and readability, this application may set forth particular pronouns and other linguistic qualifiers of various specific gender and number, but, where this occurs, all other logically possible gender and number alternatives should also be read in as both conjunctive and alternative statements, as if equally, separately set forth therein.

The embodiments set forth in detail in this application are to ease the reader's understanding of inventions set forth herein and, as such, are only examples of the virtually innumerable number of alternative embodiments falling within the scope of the application. No specific embodiment set forth in this application should be read as limiting the scope of any claimed inventions.

These and other aspects of the invention will be made clearer below, in other parts of this application. This Summary, the Abstract, and other parts of the application, are for ease of understanding only, and no part of this application should be read to limit the scope of the invention, whether or not it references matter in any other part.

DETAILED DESCRIPTION OF THE INVENTION

The example embodiments of the invention presented herein are directed to new systems, devices and methods for managing remote presentations and managing projects, which are now described herein. This description is not intended to limit the application of the example embodiments presented herein. In fact, after reading the following description, it will be apparent to one skilled in the relevant art(s) how to implement the following example embodiments in alternative embodiments.

Figure 1:
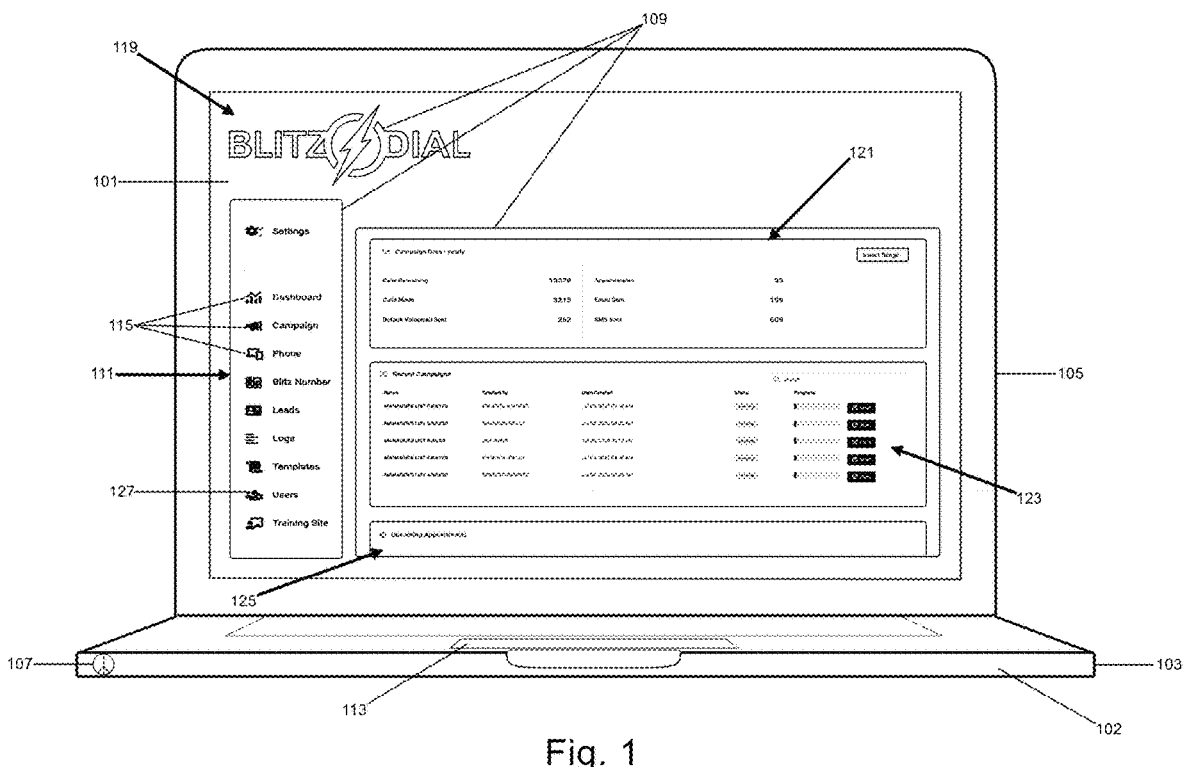
FIG. 1 depicts an example administrative dashboard G.U.I., including some example G.U.I. tools, configured for use by an administrative user of a teleconferencing and relationship management system, in accordance with some embodiments of the present invention.

FIG. 1 depicts an example administrative dashboard G.U.I. 101, including some example G.U.I. tools, configured for use by an administrative user of a teleconferencing and relationship management system, in accordance with some embodiments of the present invention. As with any other G.U.I. elements set forth in the present application, in some embodiments, G.U.I. 101 may be may be presented and controlled by computer hardware and software of a control system, such as the example control system provided below, in reference to FIG. 5, which may comprise, and/or be comprised within, the teleconferencing and relationship management system, in some embodiments. In some embodiments, such a control system may include, or be included within, a computer 103, including local computer hardware, such as local display 105, and specialized software (e.g., a desktop software application, or "App") which, when executed, causes some of the steps and processes set forth in this application to take place. But, if so, preferably, in some embodiments, computer 103 is connected for communications (e.g., to the internet, via wireless communications antenna 107) and thus networked with another control system including computer hardware and software (e.g., a remote server), with additional specialized software (e.g., an SaaS web application) which, when executed, causes some of the steps and processes set forth in this application to take place. In some embodiments, a smartphone or other peripheral device-based app is included, as a part of, or in communication with, a control system included in case 102. However, the example of a local computer 103, and the example format of a laptop computer as pictured, is only one example of the virtually unlimited alternative forms and numbers of local and network-accessible computers that may be used to carry out aspects of the inventions set forth in this application, as will be apparent to those of skill in the art. For example, in some embodiments, multiple such local computers are provided. As another example, no local computer is provided, and, instead, all G.U.I. tools and processes may be carried out on a single computer, which may or may not be a part of a network, in some embodiments. As another example, the format of a local computer may instead be a peripheral device, such as a smartphone or other personal digital assistant device, in some embodiments. In any event, any such computer may relay instructions and other information and monitor user selections, data input, and other user behavior, through G.U.I. tools, such as the example G.U.I. tools set forth below, to aid in carrying out the processes and steps set forth in this application.

In some embodiments, and assuming the administrative user (not pictured but, e.g., a person using computer 103) has already created and logged in to its account, as set forth in steps 301 and 303, discussed below in reference to FIG. 3, such G.U.I. tools may be such as those shown as example G.U.I. tools 109. Generally speaking, in the example pictured, G.U.I. tools 109, and other G.U.I. tools set forth in this application, aid an administrative user in the management of a project involving other users in which they conduct teleconferencing and other business activities with the aid of a teleconferencing and relationship management system. Although the specific business activities will vary, in different embodiments of the invention, the example provided includes marketing activities (and sales activities in particular, involving the management and servicing of sales leads). However, as will be understood by those of ordinary skill in the art, in other embodiments, other business activities, modules, methods, and G.U.I. tools adapted for them may be substituted. Thus, when, for convenience of illustration, the description below includes a statement having "sales" or "sales leads" as descriptive terms, it should be understood that, in alternative embodiments, the terms "business" and "business prospects," may be substituted, respectively, as an additional statement, as if equally set forth herein.

For example, one such G.U.I. tool is pictured as a main navigation selection menu 111, which, when activated by a user (not pictured, but may be a human operator of computer

103) allow the user to navigate away to additional sets of G.U.I. tools, other than those pictured in the present figure (e.g., presented on other "pages" created by html and other programming). For example, in some embodiments, the administrative user may select available links, e.g., by using mouse 113 to place a pointer tool (not pictured) presented on display 105 over any of the example navigable links 115 and "clicking on" them, using mouse 111.

As another example, in some embodiments, a branding G.U.I. 117 is provided, which, when activated by the administrator user, may allow a user to change its appearance, for example, by providing a link to upload an alternative graphical element (e.g., a logo, such as example BLITZDIAL logo 119). By uploading such a graphical element tied to branding of the administrative user, or a business organization or other entity, all other users provided with login credentials, and who successful log in through those credentials, as discussed further below, will also see such a graphical element, instead of another, default graphical element, in some embodiments. In this way, and in such embodiments, a super-administrative user, providing the administrative user with access to G.U.I. 119, may "white label" the teleconferencing and relationship management system.

In some embodiments, G.U.I. tools are provided that permit a user to view and explore statistical information (such as key performance indicators ("K.P.I.s") regarding efforts by other users to manage business prospects, such as sales leads. For example, K.P.I.s presentation tool 121 is provided, displaying various key information related to managing sales efforts by users using the teleconferencing and relationship management system to pursue sales campaigns. Other G.U.I. tools may allow such an administrator to start and assign such campaigns, for example, by designating a user to pursue a group of leads, using example campaign/user assignment tool 123. As another example, in some embodiments, an appointment scheduling G.U.I. tool 125 may be provided (partially shown) which may allow such an administrative user to view, schedule and create teleconferences and other interactions between other users and sales leads, through the teleconferencing and relationship management system.

As will be apparent to those of ordinary skill in the art to which the present invention applies, a wide range of alternative G.U.I.s and G.U.I. tools may include, or be modified to include or combine with, the G.U.I.s, aspects and techniques of the present invention, as set forth in this application, in some embodiments. The mention, depiction or discussion of any specific language, type or stylization of G.U.I. tools and graphical features are only examples of the virtually unlimited alternatives falling within the scope of the invention.

More generally, the exact detailed embodiments provided throughout this application, including the aspects and techniques set forth in the figures and discussed in detail in this application are, of course, examples, and not limiting. Rather, these embodiments are intended only as a reasonable set of possible example systems, graphics, structures, sub-structures, G.U.I.s, methods, steps, techniques and other aspects of the present invention, among virtually infinite and innumerable possibilities for carrying out the present invention, to ease comprehension of the disclosure, as will be readily apparent to those of ordinary skill in the art. For example, the description of one particular order, number or other arrangement of any aspects of the present invention set forth herein is illustrative, not limiting, and all other possible orders, numbers, arrangements, etc., are also within the scope of the invention, as will be so readily apparent. Any aspect of the invention set forth in this application may be included with any other aspect, as well as any aspects known in the art, in any number, order, arrangement, or alternative configuration, in particular embodiments, while still carrying out, and falling within the scope of, the invention.

Figure 2:
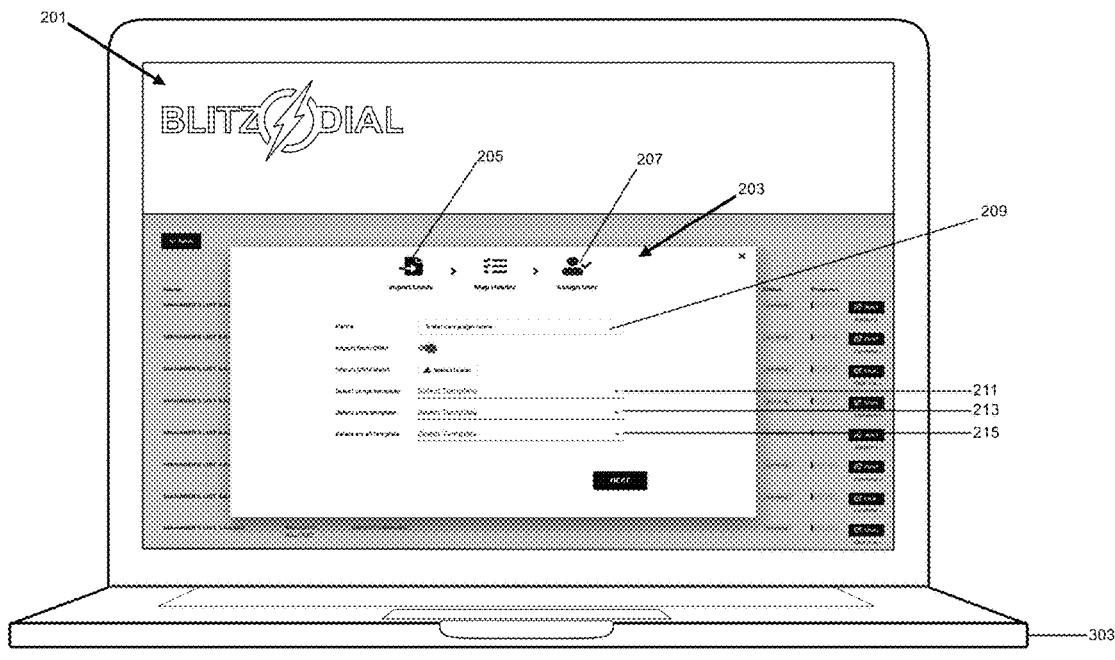
FIG. 2 depicts some additional example G.U.I. tools, which also may be utilized by an administrative user of a teleconferencing and relationship management system, in accordance with some embodiments of the present invention.

FIG. 2 depicts some additional example G.U.I. tools, on another example administrative dashboard G.U.I. 201, which also may be utilized by an administrative user of a teleconferencing and relationship management system, in accordance with some embodiments of the present invention. As with the G.U.I. tools set forth above, and other G.U.I. tools set forth in the present application, the G.U.I. tools of G.U.I. 201 may be provided on a computer (which may comprise, or be comprised in, a control system, such as the example control system provided in FIG. 5, below), such as example computer 103, including local computer hardware, such as local display 105, and specialized software (e.g., a desktop software application, or "App") which, when executed, causes some of the steps and processes set forth in this application to take place. But, if so, preferably, in some embodiments, such a computer is connected for communications (e.g., to the internet, via wireless communications antenna 107) and thus networked with another control system including computer hardware and software (e.g., a remote server), with additional specialized software (e.g., an SaaS web application) which, when executed, causes some of the steps and processes set forth in this application to take place. In some embodiments, as with other computers and control systems set forth in the present application, example computer 103, and such a control system of which it is a part, comprises and/or is comprised in a teleconferencing and relationship management system, as discussed in the present application. Such a teleconferencing and relationship management system, including such a control system comprised within or comprising it, are sometimes referred to, together, as a "the system," throughout this application.

In some embodiments, G.U.I. 201 includes a sales campaign sourcing and assignment G.U.I. tool 203—namely, a pop-up panel resulting from the administrative user selecting (e.g., clicking on or double-clicking on, depending on the embodiment) a link or other previously appearing tool, in some embodiments. Generally speaking, G.U.I. tool 203 aids an administrative user in sourcing sales leads (which may be inbound and/or outbound sales leads from lists or other rank orders of such leads, generated by any techniques set forth in the present application) and creating a new grouping of sales leads for assignment to a business development or other non-administrative user (e.g., a sales representative) to complete in a certain manner, over a certain time period, as a sales "campaign," which may be also managed, at least in part, by a sales lead module and/or series of sub-modules of the teleconferencing and relationship management system, in some embodiments. Accordingly, sales campaign sourcing and assignment G.U.I. tool 203 includes a series of G.U.I. sub-tools configured for that purpose, in some embodiments.

For example, a lead importation tool, such as example lead importation tool 205, is provided in some embodiments. By activating (again, e.g., "clicking on," or double-clicking on, using a cursor or pointer G.U.I. tool of the system) lead importation tool 205, the administrative user may upload a list (e.g., in comma-separated value, "csv," or MICROSOFT EXCEL, "xls," data file format) to the system of persons and/or entities which are a group of business prospects (e.g., sales leads), and information related to each such sales lead. In some embodiments, such a list may be generated from a lead pool, as discussed in greater detail below, in reference to FIG. 4. In some embodiments, the system may rank such business prospects according to an urgency.

For example, in some embodiments, a sales lead management module of the teleconferencing and relationship management system ranks certain sales leads as more urgent and/or time-sensitive to engage (a.k.a. "hotter sales leads") than other sales leads managed by the teleconferencing and relationship management system. In some embodiments, such a sales lead management module of the teleconferencing and relationship management system selects certain sales leads as the most urgent and/or time-sensitive to engage (a.k.a. "hot sales leads") than other sales leads managed by the teleconferencing and relationship management system. In some such embodiments, the sales lead management module may create one or more lists, from a subset of business prospects identified in a lead pool, based on their similarity in such a ranking (e.g., based on each business prospect having such a ranking with a value within the same percentile of all rankings of business prospects in a lead pool, such as the top 5%, 10%, 20%, 30%, 40% or 50% of such rankings in the lead pool). In some embodiments, any of a: recency of contact, credit score, soft credit score, informal credit score, externally mined employment data (e.g., employment status, employment title, employer type, salary information, etc.), type of business experience or interest, and/or demographic information of the person or entity of a particular sales lead and/or business prospect, may positively or otherwise impact such an urgency rating for that prospect and/or generated script elements by an artificial intelligence module of the sales lead management module.

In some embodiments, a user assignment tool 207 is provided which, when activated by the administrative user, assigns such a group of sales leads to another user, for servicing through the teleconferencing and relationship management system.

In some embodiments, the administrative user may name a sales campaign being created and assigned to another user, by entering a title, or other terms for identifying such a campaign, for example, within a data entry window G.U.I. sub-tool 209.

In some embodiments, the administrative user may create additional G.U.I. sub-tools, for presentation within a G.U.I. of the user handling such a campaign. For example, in some embodiments, as pictured, the administrative user may provide key data relevant to servicing sales leads within a campaign, such as a specialized sales script, to be provided to each such sales lead during a phone call, e-mail and/or text message sent to such a lead, using the teleconferencing and relationship management system. For that purpose, example script text uploading G.U.I. tools 211, 213 and 215, respectively, are provided.

Figure 3:
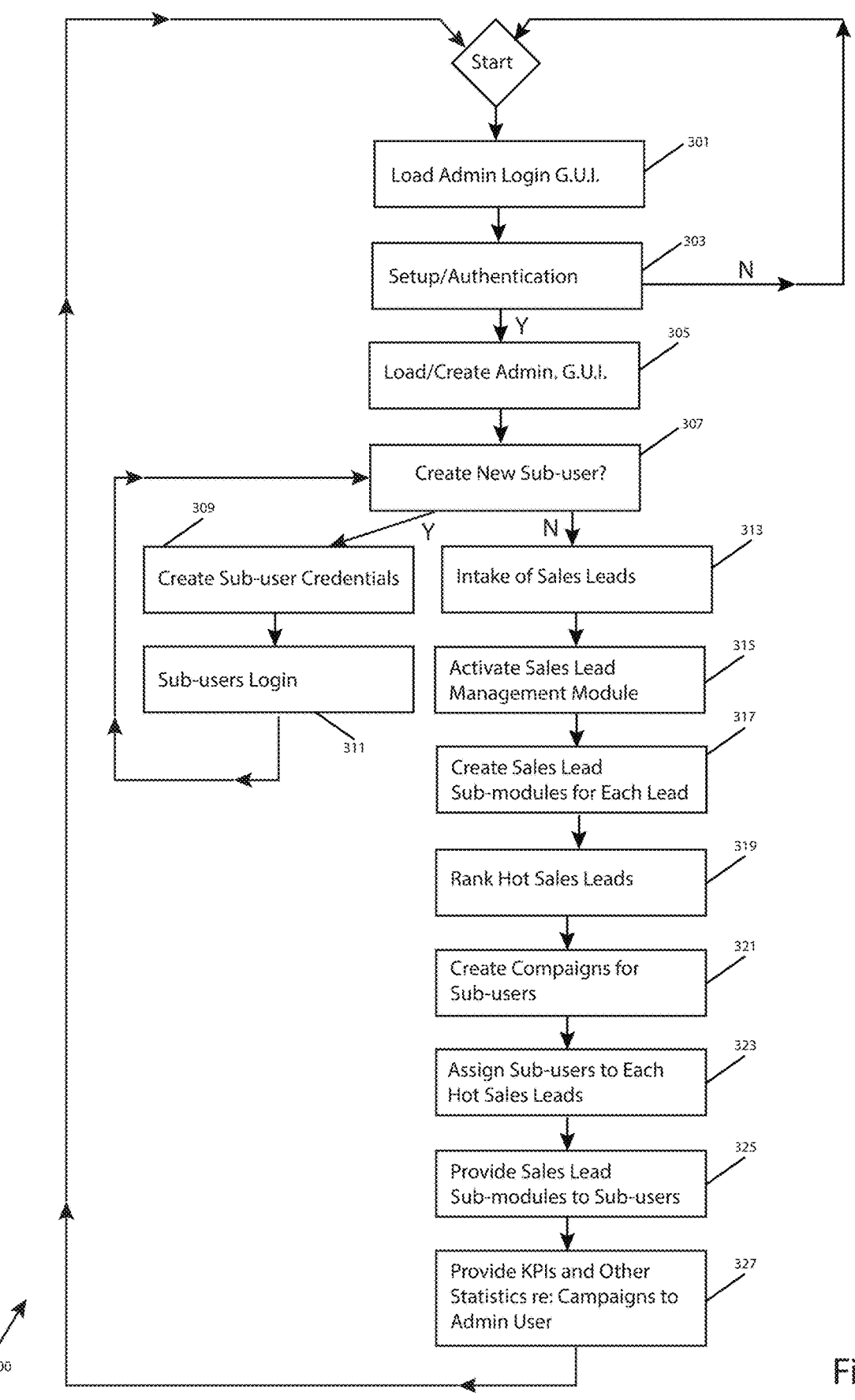
FIG. 3 is a process flow diagram, illustrating several example steps that may be carried out by a control system, such as the example control system set forth below, in reference to FIG. 5, comprised in, or comprising, a teleconferencing and relationship management system, in accordance with some additional embodiments of the present invention.

FIG. 3 is a process flow diagram, illustrating several example steps 300 that may be carried out by a control system ("the system"), such as the example control system set forth below, in reference to FIG. 5, comprised in, or comprising, a teleconferencing and relationship management system, in accordance with some additional embodiments of the present invention. Generally speaking, such teleconferencing and relationship management systems, as set forth in the present application, may be part of a portal (e.g., delivered as a Platform-as-a-Service ("PaaS") and/or Software-as-a-Service ("SaaS")) for aiding both administrative user(s) (e.g., executive manager(s)) and other authorized user(s) managed by the administrative user(s) (e.g., sales representative(s)) of an organization. In some embodiments, such an organization may be a business or other entity having a license to use hardware and/or software of such a such teleconferencing and relationship management system. In some such embodiments, an owner or other super-administrative user of a such teleconferencing and relationship management system may also be aided by it, having greater privileges than administrative users (e.g., including the right to authorize and close administrative user's accounts, in some embodiments). Thus, in some embodiments, such a portal is owned by a third party, other than the administrative user or an organization of which the administrative user is a part, and may charge a usage-based or licensing fee(s) to such social media advertisers and social media platforms, in some embodiments, for so using the PaaS. It should be understood that he following example steps, and the order and number of steps presented, are not exhaustive and do not limit the scope of the invention, being only examples of the virtually unlimited possible alternative steps, and orders, numbers and other arrangements of steps falling within the scope of the invention, as will be understood by those of skill in the art. Also as would be so understood, each of the described steps may be taken as set forth therein, in FIG. 3, in some, but not all embodiments. In other embodiments, only some or all steps, and/or additional steps other than those described herein, may be taken, within the scope of the inventions set forth in the present application.

In accordance with some embodiments, the system begins with step 301, in which it presents a G.U.I. (e.g., a Login screen) prompting an administrative user of the system to enter information verifying and/or authenticating their identity. In some embodiments, such information may include any suitable information for such a purpose known in the art for logging in and obtaining access to private computer hardware and software, such as a unique user name and password, and/or additional information (if the system is utilizing 2- or 3-factor authentication methods). If the administrative user succeeds in entering that information, which is verified by the system, in step 303, the system proceeds to step 305, in some embodiments, in which it presents a G.U.I. with additional tools aiding in the management of a teleconferencing and relationship management system. In some embodiments, such a G.U.I. with additional tools is administrative dashboard G.U.I. 101, as discussed above.

The system may then proceed to step 307, in which the administrative user may add one or more new user(s), whose work servicing business prospects (e.g., sales leads) may then be aided with use of the teleconferencing and relationship management system, in some embodiments. For example, in some embodiments, the administrative user may create a user account for each of those users, including different login information for those users in subsequent step 309, using user management G.U.I. tool 127, which allows those users to log in to the system, in step 311, and access other G.U.I.s provided by the system for that purpose, such as the example login screen G.U.I. 601, discussed below, in accordance with some embodiments of the present application.

The system may then return to step 307, if the administrative user is finished adding additional users, as discussed immediately above, and the system may then proceed to step 313, in which it may intake data related to sales leads from sources (which may be widely varied in source, and may originate from inside or outside of the system, in various embodiments). For example, as discussed in further detail below, in some embodiments, the system may store such sales lead information in a lead database, creating a pool of leads, and lead-related information (a "lead pool") generated from such widely varying sources (e.g., using a multiplex network connection, or a plurality of such connections, which may be intermittently connected, in some embodiments).

In some embodiments, the system may then proceed to step 315, in which a sales lead management module of the system, such as the example provided as sales lead management module 403, discussed below, is activated. In some embodiments, upon being so activated, such a sales lead management module creates and updates a series of sales lead sub-modules of the system in subsequent step 317, such as the example sales lead sub-modules 405, 407 and 409, also discussed below. In some embodiments, the system next applies a ranking method—for example, by applying an algorithm, in some embodiments—and assigns a level of priority (e.g., as a a "rank" or "ranking," by any of the ranking methods set forth above, or elsewhere in this application) to each sales lead, in subsequent step 319.

Next, in some embodiments, the system and/or the administrative user may create groupings of such leads (in some embodiments, based at least in part, on their rankings) into sales campaigns, in step 321, and assign such sales to particular users for servicing, in step 323. As discussed in greater detail below, to aid in such servicing, the system may provide the sales lead sub-modules pertaining to leads within each campaign, to the respective assignee/user of that campaign, in step 325. In some embodiments, such sales leads, sales lead information, and sales lead sub-modules, and G.U.I. sub-tools, may be automatically added to campaigns and/or users for servicing. In some such embodiments, such sales leads, sales lead information, and sales lead sub-modules, and G.U.I. sub-tools, may be so automatically added to campaigns and/or users for servicing if their rank, as discussed above, is determined to exceed a predetermined threshold (e.g., in the top 5, top 10, top 20) most urgent leads for servicing. In some embodiments, the most recently received, created or originated leads are assigned a higher rank, and are so automatically added for immediate servicing. In this way, in some embodiments, hot sales leads, and sales lead sub-modules related thereto, may be created, and engaged (e.g., via telephone call) within an extremely fast time window (e.g., 2 seconds, 5 seconds, 10 seconds, or 30 seconds), which may be determined in advance by the user and/or teleconferencing and relationship management system.

The system may aid the administrative user in a variety of additional ways, as will be discussed in greater detail below, in the ongoing management of the campaigns so assigned, in some embodiments. For example, in some embodiments, the system may provide G.U.I. aspects related to key performance indicators ("K.P.I.s") or other information related to sales or other marketing campaigns, such as example K.P.I.s presentation tool 121, discussed above. In some embodiments, the system may then provide G.U.I.s enabling the administrative user to further manage the campaigns and servicing of sales leads (e.g., by reassigning campaigns, reallocating sales leads to campaigns, running mystery shopping tests, providing and evaluating training materials through an L.M.S. module, or taking any other actions as set forth in this application for such management.

Figure 4:
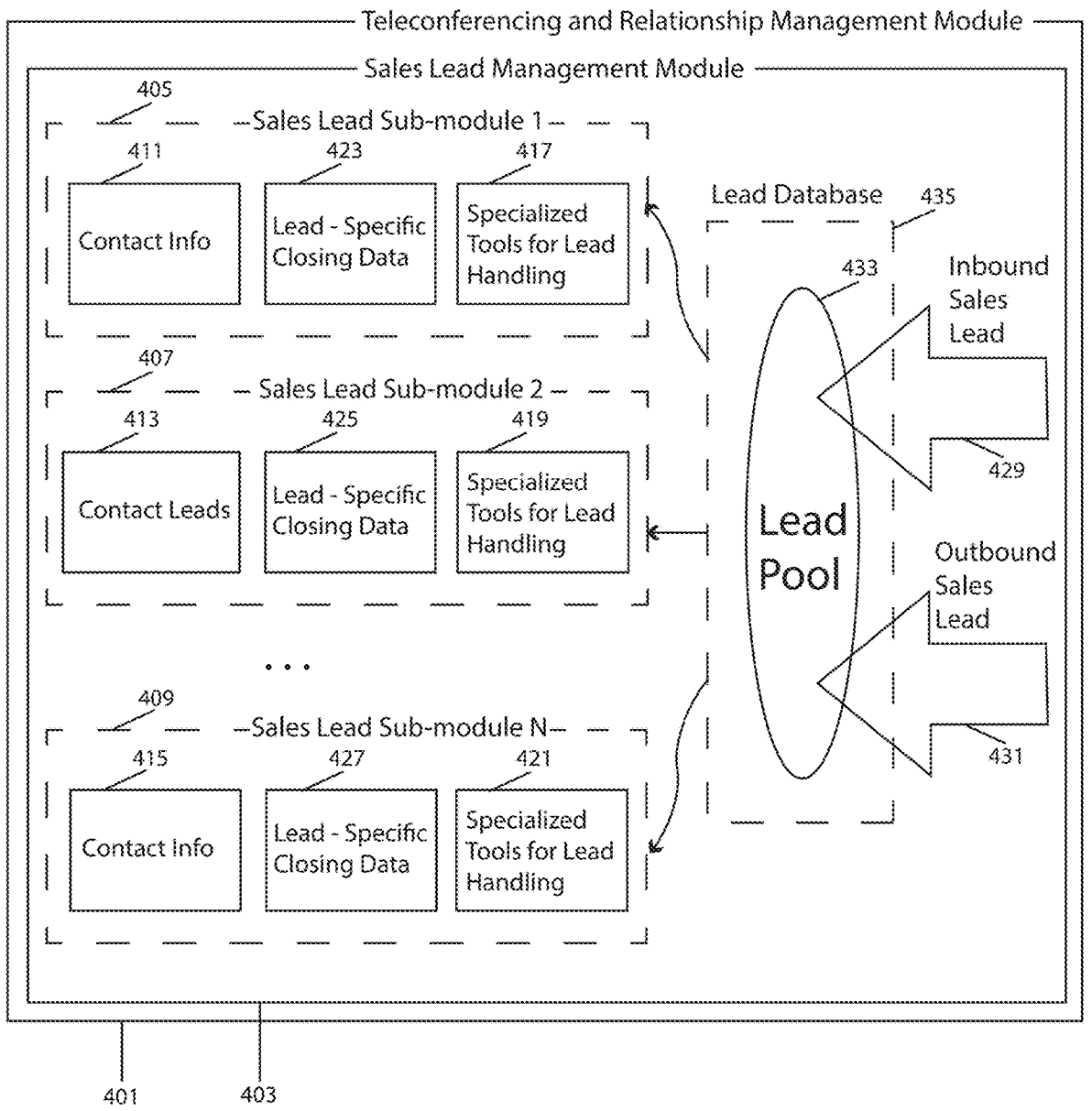
FIG. 4 is a is a block diagram, illustrating some elements of an example teleconferencing and relationship management system, in accordance with some embodiments of the present invention.

FIG. 4 is a is a block diagram, illustrating some elements of an example teleconferencing and relationship management system 401, in accordance with some embodiments of the present invention. As also mentioned elsewhere in this application, in some embodiments, such a teleconferencing and relationship management system includes a sales lead management module, such as example sales lead management module 403. In some such embodiments, the sales lead management module (a.k.a., a "BlitzDial subsystem" or "BlitzDial component") is configured to create one or more sales lead sub-modules, such as example sales lead sub-modules 405, 407 and 409, each being dedicated to a particular sales lead, of a plurality of sales leads, and each including contact information, identifying information (such as example contact information 411, 413 and 415, respectively), and additional lead-specialized tools (417, 419 and 421, respectively) and other salient data (423, 425 and 427, respectively) to be used in attempting to close that sales lead. As mentioned above, in some embodiments, the sales lead management module selects certain sales leads from as more urgent and/or time-sensitive to engage ("hot sales leads") than other sales leads managed by the teleconferencing and relationship management system. In some embodiments of the present invention, hot sales leads, and sales lead sub-modules dedicated thereto, may be created, and engaged (e.g., via telephone call) within an extremely fast time window (e.g., 2 seconds, 5 seconds, 10 seconds, or 30 seconds), which may be determined in advance by the user and/or teleconferencing and relationship management system.

In some embodiments, such an additional tool includes a G.U.I. presenting one or more single action sub-tools (e.g., a G.U.I. button or slider) for immediately taking a plurality of actions to pitch such a hot sales lead. In some such embodiments, such a sub-tool includes a telephone calling tool, configured to immediately place a telephone call to the hot lead, with a single gesture by a user. In some embodiments, such a sub-tool includes a specialized e-mailing tool, configured to immediately send an e-mail to the hot lead, with a single gesture by a user. In some embodiments, such a sub-tool includes a text messaging tool, configured to immediately send a specialized text message to the hot lead, with a single gesture by a user. In some embodiments, such a sub-tool includes a tool with specialized "next call" functionality, again, configured to be activated with a single gesture by a user, which is configured place a telephone call to the hot lead immediately after previously scheduled call has ended.

As also mentioned above, in various embodiments, sales leads, including, but not limited to, hot leads, may be derived from inbound or outbound marketing sources. In some embodiments of the present invention, a multiplex communications feature includes communications from a variety of external control systems (which may be as provided, or similar to that provided, as the example control system set forth in FIG. 5, below), and such various forms of sales leads may be provided from numerous, disparate control systems, in communication with the teleconferencing and relationship management system. Such multiplex communications and lead information importations are demonstrated by example inbound sales lead transmissions arrow 429 and example outbound sales lead transmissions arrow 431. In some embodiments, such disparate control systems may communicate with, and record all such sales lead data from various sources (a.k.a., a Lead Pool, such as example lead pool 433) within a database 435 including all such lead information (e.g., a relational database, such as an SQL file or files.)

Figure 5:
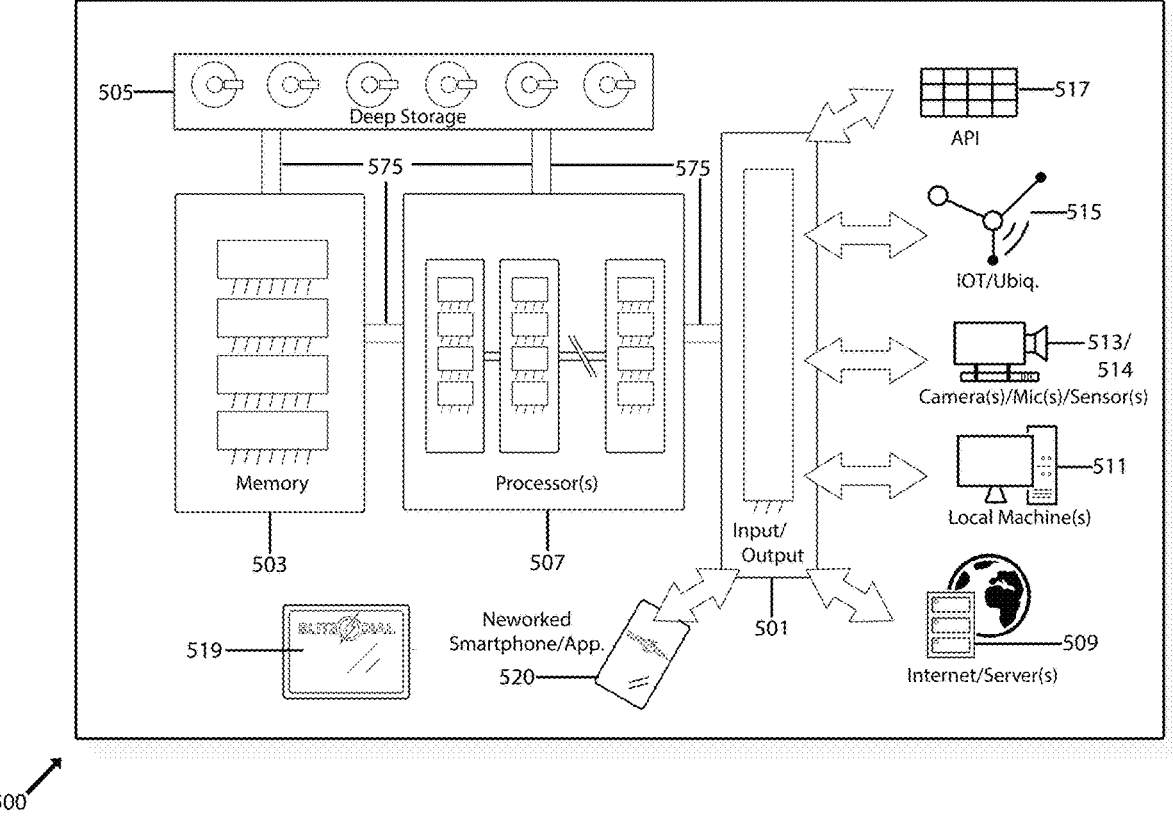
FIG. 5 is a schematic block diagram of some elements of a control system in accordance with some example embodiments of the invention.

FIG. 5 is a schematic block diagram of some elements of a control system 500, including computer hardware and software, in accordance with some example embodiments of the invention. In some example embodiments, the control system incorporates a non-transitory machine-readable medium storing instructions that, when executed by one or more processors, execute various aspects of the present inventions described in this application. The generic and other components and aspects described herein are not exhaustive of the many different systems and variations, including a number of possible hardware aspects that might be used, in accordance with the example embodiments of the invention. Rather, the control system 500 shown depicts some example embodiments.

Control system 500 includes an input/output device 501, a memory device 503, long-term data storage device 505, and processor(s) 507. The processor(s) 507 is (are) capable of receiving, interpreting, processing and manipulating signals and executing instructions for further processing and for output, pre-output and/or storage in and outside of the system. The processor(s) 507 may be general or multipurpose, single- or multi-threaded, and may have a single core or several processor cores, including microprocessors. Among other things, the processor(s) 507 is/are capable of processing signals and instructions for the input/output device 501, to cause a user interface to be provided or modified for use by a user on hardware, such as, but not limited to, computer system peripheral devices, such as a mouse, keyboard, touchscreen and/or other display 519, providing specialized tools (e.g., providing a graphical user interface, a.k.a. a "G.U.I.," providing any of the G.U.I. tools as set forth in this application, e.g., for managing and assigning sales campaigns, sales leads and G.U.I. sub-tools related to the same, as set forth in greater detail elsewhere in this application. In some embodiments, such GUI tools are based on display-controlling and input-facilitating software (e.g., on local machine(s) 511, display 519 or smartphone 520).

For example, G.U.I. tools and other user interface aspects, such as any of the graphical "windows," "buttons," and data entry fields, may present via, for example, a display, any number of selectable options, actions, commands and/or data entry fields set forth elsewhere in this application. When such options, actions and/or data entry fields are selected or data is entered by a user (e.g., an advertiser user), such selection and/or data entry causes aspects of the control system to command other aspects of the control system to take particular actions and present additional instructions, G.U.I. tools and sub-tools, and/or other guidance to users related to managing sales leads or other business projects, as set forth in this application. For example, in some embodiments, the control system may generate an algorithm for ranking and assigning training courses through an L.M.S., connect to, or included within, the control system. The processor(s) 507 may execute instructions stored in memory device 503 and/or long-term data storage device 505, and may communicate via system bus(ses) 575. Input/output device 501 is capable of input/output operations for the system, and may include and communicate through input and/or output hardware, and instances thereof, such as a computer mouse, scanning device or other sensors, actuator(s), communications antenna(ae), keyboard(s), smartphone(s) and/or PDA(s), networked or connected additional computer(s), camera(s) or microphone(s), a mixing board(s), real-to-real tape recorder(s), external hard disk recorder(s), additional movie and/or sound editing system(s) or gear, speaker(s), external filter(s), amp(s), preamp(s), equalizer(s), computer display screen(s) or touch screen(s). Such input/output hardware could implement a program or user interface created, in part, by software, permitting the system and user to carry out the user settings and input discussed in this application. Input/output device 501, memory device 503, data storage device 505, and processor(s) 507 are connected and able to send and receive communications, transmissions and instructions via system bus(ses) 575. Data storage device 505 is capable of providing mass storage for the system, and may be or incorporate a computer-readable medium, may be a connected mass storage device (e.g., flash drive or other drive connected to a Universal Serial Bus (USB) port or Wi-Fi), may use back-end (with or without middle-ware) or cloud storage over a network (e.g., the Internet) as either a memory backup for an internal mass storage device or as a primary memory storage means, or may simply be an internal mass storage device, such as a computer hard drive or optical drive. Generally speaking, the system may be implemented as a client/server arrangement, where features of the system are performed on a remote server, networked to the client and made a client and server by software on both the client computer and server computer. In any event, the system may include, or include network connections (e.g, wired, WAN, LAN, 5G, ethernet, satellite, and/or Internet connections) with, any of the example devices or auxiliary devices and/or systems, shown as Internet server(s) 509, local machine(s) 511, cameras and microphones 513, sensor(s) 514, internet of things or other ubiquitous computing devices 515, API 517, scanner 519 and smartphone 520. Similarly, the control system 500 is capable of accepting input from any of those auxiliary devices and systems, and modifying stored data within them and within itself, based on any input or output sent through input/output device 501.

Input and output devices may deliver their input and receive output by any known means, including, but not limited to, any of the hardware and/or software examples shown as internet server(s) 509, local machine(s) 511, cameras and microphones 513, sensor(s) 514, internet of things or other ubiquitous computing devices 515, API 517, display 519 and smartphone 520.

While the illustrated example of a control system 500 in accordance with the present invention may be helpful to understand the implementation of aspects of the invention, any suitable form of computer system known in the art may be used—for example, in some embodiments, a simpler computer system containing just a processor for executing instructions from a memory or transmission source. The aspects or features set forth may be implemented with, and in any combination of, digital electronic circuitry, hardware, software, firmware, middleware or any other computing technology known in the art, any of which may be aided with external data from external hardware and software, optionally, by networked connection, such as by LAN, WAN, satellite communications networks, 5G or other cellular networks, and/or any of the many connections forming the Internet. The system can be embodied in a tangibly-stored computer program, as by a machine-readable medium and propagated signal, for execution by a programmable processor. The many possible method steps of the example embodiments presented herein may be performed by such a programmable processor, executing a program of instructions, operating on input and output, and generating output and stored data. A computer program includes instructions for a computer to carry out a particular activity to bring about a particular result, and may be written in any programming language, including compiled and uncompiled and interpreted languages and machine language, and can be deployed in any form, including a complete program, module, component, subroutine, or other suitable routine for a computer program.

Figure 6:
FIG. 6 depicts another example login screen G.U.I., including some example G.U.I. tools, configured for use by an administrative user of a teleconferencing and relationship management system, in accordance with some embodiments of the present invention.

FIG. 6 depicts another example login screen G.U.I. 601, including some example G.U.I. tools, configured for use by an administrative user of a teleconferencing and relationship management system, in accordance with some embodiments of the present invention. As discussed above, in some embodiments, a user, such as an administrative user, super-administrative user, sales agent or other business development sub-user, may be required to log in, verifying their identity, prior to gaining further access to additional G.U.I.s and tools, in some embodiments of a teleconferencing and relationship management system, or a part thereof (e.g., a home screen and/or Learning Management sub-system thereof). In some embodiments, a login screen, such as the example login screen G.U.I. 601, may be provided to allow such a user to perform an authentication routine. For example, in some embodiments, a user may provide a username and password, and enter each, respectively, into example user name data entry window 603, and password data entry window 605, for that purpose. In some embodiments, branding transformation tools, such as example brand transformation tool 607 and brand transformation tool 609, may be provided, which allow such a user, once logged in to activate them (e.g., by "clicking on" them), which may cause the system to provide a file uploading tool, through which the user may locate and upload an image file to appear instead of the appearance of such a brand transformation tool, as pictured.

Figure 7:
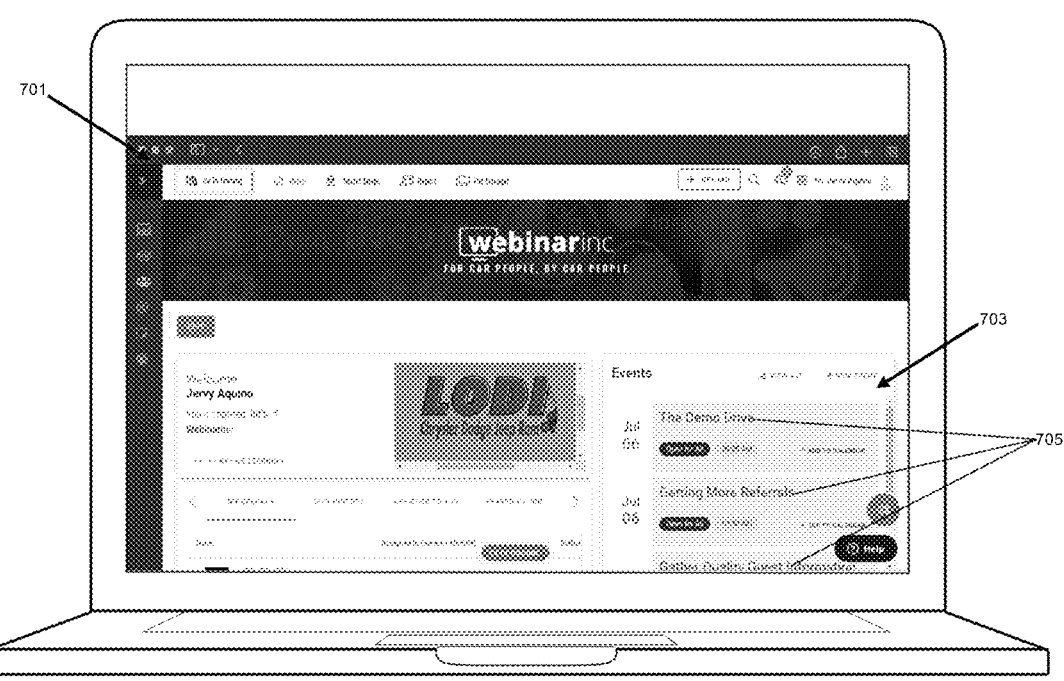
FIG. 7 depicts another G.U.I., including some example G.U.I. tools, configured for use by an administrative user of a teleconferencing and relationship management system, in accordance with some embodiments of the present invention.

FIG. 7 depicts another example learning management sub-system home screen G.U.I. 701, including some example G.U.I. tools, configured for use by a user of a teleconferencing and relationship management system, in accordance with some embodiments of the present invention. As also discussed elsewhere in this application, in some embodiments, a learning curriculum may be created and assigned to a business development employee (e.g., a sales representative) user of the system, for example, by an administrative user, as discussed above, and/or the system. In some embodiments, both the system itself (e.g., through an artificial intelligence subsystem and/or module), and such an administrative user, may contribute to the creation of such a curriculum, and associate such a curriculum with a particular campaign and or user, as also discussed elsewhere in this application.

In some embodiments, such a curriculum may include a presentation of media contents, such as instructional videos and test components, for such a user to view and complete ("LMS content"). In some embodiments, when such instructional videos and test components are successfully completed by the user, a certificate is recorded by the system. In some embodiments, such a user is not permitted to start servicing a campaign, or leads included within a campaign, unless and until particular LMS content is so completed.

Figure 8:
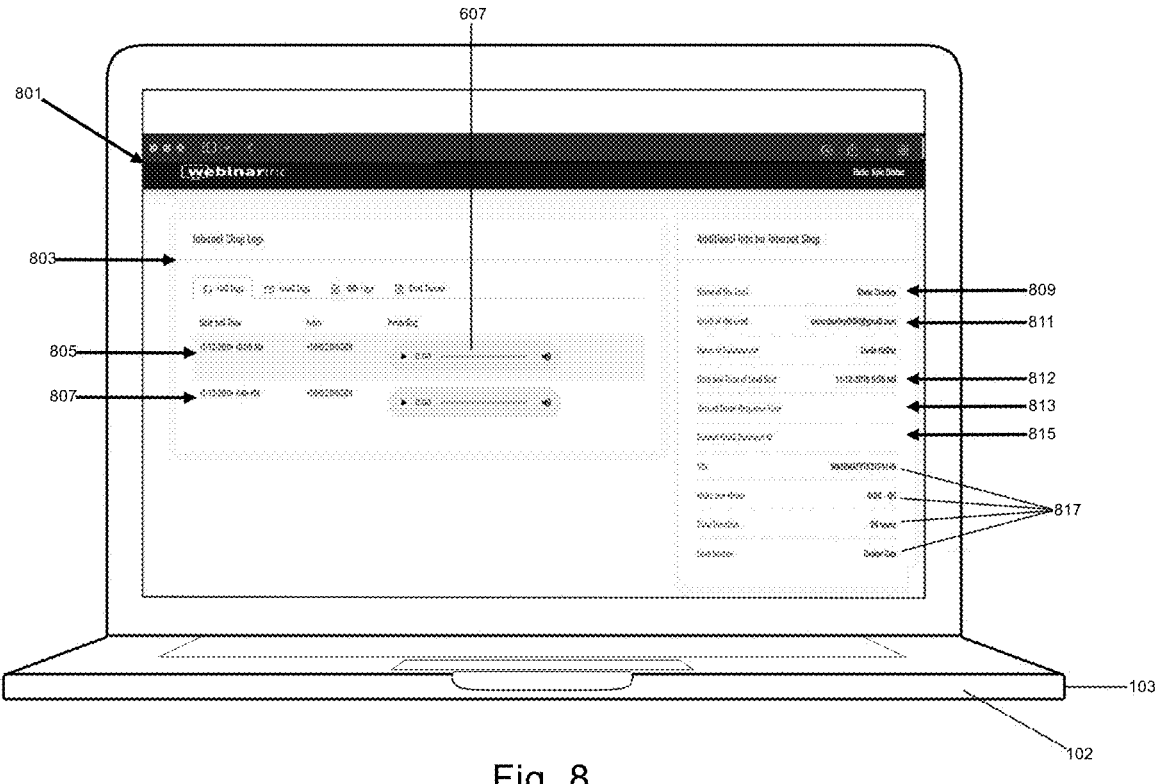
FIG. 8 depicts an example mystery shop G.U.I., configured for use by an administrative user of the teleconferencing and relationship management system to conduct mystery shop activities with a mystery shop module of the system.

In some embodiments, particular LMS content is grouped together in such a curriculum, in accordance, at least in part, based on selections and/or assignments to a particular campaign and/or a particular user or set of users, by a super-administrator of the system. For example, in some embodiments, such assignments may be based on an indication by the super-administrator (e.g., by clicking on an "assignment" button) of the particular LMS content to the user, or all user of a campaign. In some embodiments, however, the particular LMS content (e.g., a groups of such videos and test components) is based on a sub-component of the system (e.g., an algorithm created and/or executed by such an artificial intelligence module of the system). In some embodiments, such an algorithm may rank all available videos and test materials based on an urgency of addressing particular LMS content. In some such embodiments, such an algorithm assigns a positive weighting, making the system more likely to select for initial viewing (e.g., as the top item in a "playlist") of a non-event, negatively-associated key word, and/or lapse of time prior to servicing a business prospect (e.g., a sales lead or a hot sales lead) properly by the user to be subjected to the LMS content. For example, in some embodiments, if a user fails to service a business prospect within a predetermined amount of time (e.g., by contacting the lead and/or following up on a lead with a subsequent conference meeting), the system may record such a non-event, and create KPIs based on such events in general (in addition to other data). For example, in some embodiments, if a user does not service such a business prospect within two (2) minutes of the origination or receipt of the business prospect from a lead pool, such a non-event may be recorded. However, in other embodiments, shorter and longer times may be pre-selected, by the user and/or the system, as a threshold for determining when such a non-event occurs. As another example, in some embodiments, if a user does not service such a business prospect within one (1) minute of the origination or receipt of the business prospect from a lead pool, such a non-event may be recorded. As yet another example, in some embodiments, if a user does not service such a business prospect within thirty (30) seconds of the origination or receipt of the business prospect from a lead pool, such a non-event may be recorded. As yet another example, in some embodiments, if a user does not service such a business prospect within ten (10) seconds of the origination or receipt of the business prospect from a lead pool, such a non-event may be recorded. In some embodiments, a plurality of such predetermined amounts of time may be recorded by the administrative user and/or system, where a failure to service by the user within the first such amount of time (examples of which are set forth above) may be recorded as a first non-event, with first repercussions implemented by the system, of a lower severity, and where a failure to service by the user within the second such amount of time (greater than the examples of which are set forth above, respectively) may be recorded as a second non-event, with second repercussions implemented by the system, of a higher severity. For example, such first repercussions may be a warning being issued to the user and/or a requirement that the user service leads within a shorter time than achieved previously, or access to leads may be prevented or limited, in some embodiments. As another example, in some embodiments such higher severity repercussions may include the system preventing the user from accessing a campaign, unless and until particular LMS content is completed by the user. However, in some embodiments, the administrative user may instead review a record of the time that a prospect or lead is created or received (e.g., as shown in FIG. 8, as example time stamp record 812) and a record of the times the user responded to the leads (e.g., as example response time records s 813 and 815), and determine whether to implement such repercussions, or other measures, using the system, in some embodiments.

For example, in FIG. 7, another example learning management sub-system home screen G.U.I. 701 is provided, including some example G.U.I. tools configured for use by a user of a teleconferencing and relationship management system, in accordance with some embodiments of the present invention. As pictured, such a playlist 703 may be provided, which includes a series of LMS content links, to such LMS content items, such as the examples provided as LMS content links 705. After the user activates (e.g., by clicking on, or double-clicking on) any of LMS content links 705, the system may then present and record the viewing and completion of the associated LMS content, and issue such certificates, indicating successful completion of the LMS content assigned to the particular user.

In some embodiments, such non-events, negatively-associated key word(s), and/or lapses of time, may be determined by a "mystery shop" module of the system. In some embodiments, such a module is configured to facilitate an administrative user posing as a business prospect (e.g., a sales lead or hot sales lead), to gauge the user's performance in servicing such a business prospect.

For example, in FIG. 8, an example mystery shop G.U.I. 801 is provided, for use by such administrative user to conduct such mystery shop activities with such a mystery shop module of the system. In some embodiments, such an administrative user may use a business prospect servicing review tool 803 of G.U.I. tool 801, to review the conduct of a user assigned to service such a business prospect (such as a sales lead, or hot sales lead). Among other sub-tools, in some embodiments, such a servicing review tool 803 may include one or more business call playback sub-tool(s) 805 and 807, through which the administrative user may play back recorded media of a telephone call made by the user in servicing the business prospect. In some embodiments, the administrative user, and/or the user, may take notes relating to such a servicing call, including key words and/or script elements used in the servicing call. However, in some embodiments, the artificial intelligence module of the system may instead, or in addition, implement a speech-to-text, automatic captioning sub-module to determine and record actual words used by the user in the servicing call. In some embodiments, desired key words may also be recorded by the administrative user and/or the system (for example, by presence of such terms within a pre-designated servicing script assigned to the servicing call.) In either instance, in some embodiments, the absence of such key words in a servicing call may be recorded as a non-event, as discussed above, and such further repercussions as discussed above may be implemented by the user and/or system based on the occurrence of such a non-event. In some embodiments, the administrative user may manually select apparent identity information, such as an alias personal name, e.g., entered into example alias text input window 809, and an alias e-mail address, e.g., entered into example e-mail text input window 811, using which the system may generate e-mails, telephone calls and other apparent customer details to interface with the user, while running the mystery shop aspects set forth in this application.

In some embodiments, additional information relating to such servicing calls may also be reviewed by using additional review tools, such as example sales call servicing review tools 817.

The invention claimed is:

1. A system for managing business prospects, comprising:
a control system, comprising one or more processor(s) and software, verifying an identity of a user based on multi-factor authentication, and providing access to at least one graphical user interface (GUI) to the user;
a display, communicatively connected with and controlled by said control system, comprising at least one of said at least one GUI, for a salesperson user of said system, wherein said one or more processor(s) and software generate at least one GUI tool(s) and at least one sub-tool(s) of said at least one GUI tool(s) for at least one urgent sales lead, wherein said at least one sub-tool(s) includes a consolidated action slider or button actuated by said salesperson user, which causes the system to simultaneously generate A) through a telephone calling tool controlling telephony hardware, a telephone call, from said salesperson user to said at least one urgent sales lead(s) and, B) via artificial intelligence, a new script to be read during said telephone call; and
a sales lead management module of said software, controlling said one or more processor(s) to source and create one or more list(s) of sales leads, wherein said one or more processors(s) and said software are configured to implement an algorithm assigning a different urgency rank to each of said sales leads based, at least in part, on an urgency of servicing said each of said sales leads, and to designate at least one of said leads as one of said at least one urgent sales lead(s), having an urgency rank greater than at least one other sales lead within said one or more list(s) of sales leads;
wherein each of said sales leads is presented on said GUI in a position abutting a presentation of contact information, identifying information, and/or additional information configured to be used in attempting to close a sales lead;
wherein said one or more processor(s) is configured to actuate the consolidated action slider or button based on input from said salesperson user, and generate A) through the telephone calling tool controlling the telephony hardware, the telephone call, from said salesperson user to at least one of said urgent sales lead(s); and B) via artificial intelligence, the new script to be read during said telephone call; and
wherein said control system comprises telephone call recording hardware, configured to record and play back said telephone call to an administrative user of said system.

2. The system for managing business prospects of claim 1, comprising a lead database, comprising a lead pool, and wherein said urgency and said different urgency rank assigned to said each of said sales leads are based on an algorithm implemented by said system including a recency of contact and a credit score of said each of said sales leads.

3. The system for managing business prospects of claim 1, comprising a learning management sub-system, and wherein said at least one GUI tool(s) comprises a presentation of media contents of a curriculum, and wherein said curriculum and said presentation of media contents are configured to be indicated by an administrator user of said system.

4. The system for managing business prospects of claim 1, wherein said urgency and said different urgency rank assigned to said each of said sales leads is based, at least in part, on a recency of an origination of said each of said sales leads.

5. The system for managing business prospects of claim 1, wherein at least some of said sales leads are determined to be hot sales leads, based on having an urgency rank exceeding a predetermined threshold.

6. The system for managing business prospects of claim 1, wherein said system creates a separate sales lead sub-module, comprised within said sales lead management module, for each of said sales leads.

7. The system for managing business prospects of claim 1, wherein said system creates a plurality of sales lead sub-modules, comprised within said sales lead management module.

8. The system for managing business prospects of claim 6, wherein said separate sales lead sub-module comprises contact information and identifying information related to a particular sales lead, and additional tools and data configured to be used in attempting to close said particular sales lead.

9. The system for managing business prospects of claim 3, wherein said presentation of media contents are configured to be indicated by an administrator user of said system, at least in part, by including a link to a video, or group of videos, and academic testing materials.

10. The system for managing business prospects of claim 3, wherein an artificial intelligence sub-module of said sales lead management module creates said curriculum based on a transcription of a conference, and performing a negative key word analysis based on a comparison of a preassigned script to said transcription.

11. A system for managing business prospects, comprising:

a control system, comprising one or more processor(s) and software, verifying an identity of a user based on multi-factor authentication, and providing access to at least one graphical user interface (GUI) to the user;

a display, communicatively connected with and controlled by said control system, comprising at least one of said at least one GUI, for a user of said system, wherein said one or more processor(s) and said software generate at least one GUI tool(s) and at least one sub-tool(s) of said at least one GUI tool(s) for at least one urgent business prospect, wherein said at least one sub-tool(s) includes a consolidated action slider or button which, when actuated by said user, causes the system to simultaneously generate A) through a telephone calling tool controlling telephony hardware, a telephone call from said user to said at least one urgent business prospect and, B) via artificial intelligence, a new script to be read during said telephone call; and a business prospect management module of said software, controlling said one or more processor(s) to source a plurality of business prospects wherein said business prospect management module is configured to assign a different urgency rank to each of said business prospects based, at least in part, on an urgency of servicing said each of said business prospects;

wherein each of said business prospects is presented on said GUI in a position abutting a presentation of contact information, identifying information, and/or additional information configured to be used in attempting to engage a business prospect in business;

wherein said one or more processor(s) is configured to actuate the consolidated action slider or button based on input from said user and generate A) through the telephone calling tool controlling telephony hardware, the telephone call, from said salesperson user to said business prospect; and B) via artificial intelligence, a new script to be read during said telephone call; and wherein said control system comprises telephone call recording hardware, configured to record and play back said telephone call to an administrative user of said system.

12. The system for managing business prospects of claim 11, comprising a business prospect database comprising a business prospect pool, and wherein said urgency and said different urgency rank assigned to each of said business prospects are based on an algorithm implemented by said system including a recency of contact and a credit score of said each of said business prospects.

13. The system for managing business prospects of claim 11, comprising a learning management sub-system, and wherein said at least one GUI tool(s) comprises a presentation of media contents of a curriculum, and wherein said curriculum and said presentation of media contents are configured to be indicated by an administrator of said system.

14. The system for managing business prospects of claim 11, wherein said urgency and said different urgency rank assigned to said each of said business prospects is based, at least in part, on a recency of an origination of said each of said business prospects.

15. The system for managing business prospects of claim 11, wherein at least some of said business prospects are determined to be hot business prospects, based on having an urgency rank exceeding a predetermined threshold.

16. The system for managing business prospects of claim 11, wherein said system creates a separate business prospects sub-module, comprised within said business prospects management module, for each of said business prospects.

17. The system for managing business prospects of claim 11, wherein said system creates a plurality of business prospect sub-modules, comprised within said business prospects management module.

18. The system for managing business prospects of claim 16, wherein said separate business prospect sub-module comprises contact information and identifying information related to a particular business prospect, and additional tools and data configured to be used in attempting to close said particular business prospect.

19. The system for managing business prospects of claim 17, wherein said plurality of business prospect sub-modules each comprise contact information and identifying information related to a particular business prospect, and additional tools and data configured to be used in attempting to close said particular business prospect.

20. The system for managing business prospects of claim 13, wherein an artificial intelligence sub-module of said business prospect management module creates said curriculum based on a transcription of a conference, and performing a negative key word analysis based on a comparison of a preassigned script to said transcription.

* * * * *